(12) United States Patent
Boiero

(10) Patent No.: US 10,422,906 B2
(45) Date of Patent: Sep. 24, 2019

(54) MODELING AND FILTERING COHERENT NOISE IN SEISMIC SURVEYS

(71) Applicant: WESTERNGECO L.L.C., Houston, TX (US)

(72) Inventor: Daniele Boiero, Gatwick (GB)

(73) Assignee: WESTERNGECO L.L.C., Houston, TX (US)

( * ) Notice: Subject to any disclaimer, the term of this patent is extended or adjusted under 35 U.S.C. 154(b) by 140 days.

(21) Appl. No.: 15/120,849

(22) PCT Filed: Mar. 2, 2015

(86) PCT No.: PCT/US2015/018294
§ 371 (c)(1),
(2) Date: Aug. 23, 2016

(87) PCT Pub. No.: WO2015/134379
PCT Pub. Date: Sep. 11, 2015

(65) Prior Publication Data
US 2016/0363681 A1     Dec. 15, 2016

Related U.S. Application Data

(60) Provisional application No. 61/947,254, filed on Mar. 3, 2014.

(51) Int. Cl.
*G01V 1/36* (2006.01)
*G01V 1/30* (2006.01)
(Continued)

(52) U.S. Cl.
CPC .............. *G01V 1/364* (2013.01); *G01V 1/282* (2013.01); *G01V 1/306* (2013.01); *G01V 1/36* (2013.01);
(Continued)

(58) Field of Classification Search
CPC .............. G01V 1/28; G01V 1/30; G01V 1/36
See application file for complete search history.

(56) References Cited

U.S. PATENT DOCUMENTS

| 5,784,333 A * | 7/1998 | Tang ..................... G01V 1/50 166/250.02 |
| 7,917,295 B2 | 3/2011 | Strobbia |

(Continued)

FOREIGN PATENT DOCUMENTS

EP     2326971 A1     6/2011

OTHER PUBLICATIONS

Ernst, Removal of guided waves from seismic data in laterally varying media, ELSEVIER, Wave Motion 28 (1998) 173-189 (Year: 1998).*

(Continued)

*Primary Examiner* — Michael J Dalbo
(74) *Attorney, Agent, or Firm* — Michael Guthrie

(57) ABSTRACT

Systems, methods, and media for modeling and filtering noise in seismic surveys are disclosed. Methods, systems, and computer program products in accordance with the present disclosure perform operations including obtaining seismic information of a region resulting from a source waveform applied to the region. The operations also include obtaining an estimate of visco-elastic properties of a near-surface of the region. The operations further include determining an estimate of propagation of guided waves in the region based on the estimate of visco-elastic properties of a near-surface of the region. Additionally, the operations include determining a model of the guided waves in the near-surface of the region using the estimate of propagation of the guided waves and an estimate of the source waveform. Moreover the operations include determining a filtered out- (Continued)

put of the seismic information by removing the model of the guided waves from the seismic information.

20 Claims, 6 Drawing Sheets

(51) Int. Cl.
  *G01V 1/28* (2006.01)
  *G01V 1/38* (2006.01)
(52) U.S. Cl.
  CPC ........ *G01V 1/38* (2013.01); *G01V 2210/3246* (2013.01); *G01V 2210/6242* (2013.01); *G01V 2210/67* (2013.01)

(56) References Cited

U.S. PATENT DOCUMENTS

| | | | | |
|---|---|---|---|---|
| 2005/0024990 | A1* | 2/2005 | Laake | G01V 1/003 |
| | | | | 367/38 |
| 2005/0068850 | A1* | 3/2005 | Muyzert | G01V 1/286 |
| | | | | 367/38 |
| 2005/0149267 | A1 | 7/2005 | Van Den Beukel et al. | |
| 2006/0133207 | A1 | 6/2006 | Vossen et al. | |
| 2008/0294393 | A1* | 11/2008 | Laake | G01V 11/00 |
| | | | | 703/1 |
| 2009/0276159 | A1* | 11/2009 | Strobbia | G01V 1/364 |
| | | | | 702/17 |
| 2010/0128563 | A1* | 5/2010 | Strobbia | G01V 1/30 |
| | | | | 367/49 |
| 2011/0010143 | A1 | 1/2011 | Dai et al. | |
| 2011/0069581 | A1* | 3/2011 | Krohn | G01V 1/364 |
| | | | | 367/43 |
| 2012/0029828 | A1* | 2/2012 | Pepper | G01V 1/301 |
| | | | | 702/16 |
| 2012/0257476 | A1* | 10/2012 | Muhl | G01V 1/325 |
| | | | | 367/38 |
| 2012/0300987 | A1* | 11/2012 | Protasov | G01V 1/28 |
| | | | | 382/109 |
| 2014/0198613 | A1* | 7/2014 | Yang | G01V 1/28 |
| | | | | 367/24 |
| 2014/0226437 | A1* | 8/2014 | Chambers | G01V 1/36 |
| | | | | 367/7 |

OTHER PUBLICATIONS

Ernst, E., 2013, Modal Elastic Inversion: 75th EAGE Conference and Exhibition, Expanded Abstracts, (5 pages).
Krohn, C. E., 2010, SWIPER—Multi-mode Surface Wave Prediction and Removal by Waveform Matching: 72nd EAGE Conference and Exhibition, Expanded Abstracts. (5 pages).
Le Meur, D., N. Benjamin , L. Twigger, K. Garceran, L. Delmas, and G. Poulain, 2010, Adaptive attenuation of surface-wave noise: First Break, 28, 83-88.
International Search Report and Written Opinion issued in the related PCT application PCT/US2015/018294 dated Jun. 5, 2015.
International Preliminary Report on Patentability for the equivalent International patent application PCT/US2015/018294 dated Sep. 15, 2016.
Extended Search Report for the equivalent European patent application 15758912.8 dated Nov. 7, 2017.

\* cited by examiner

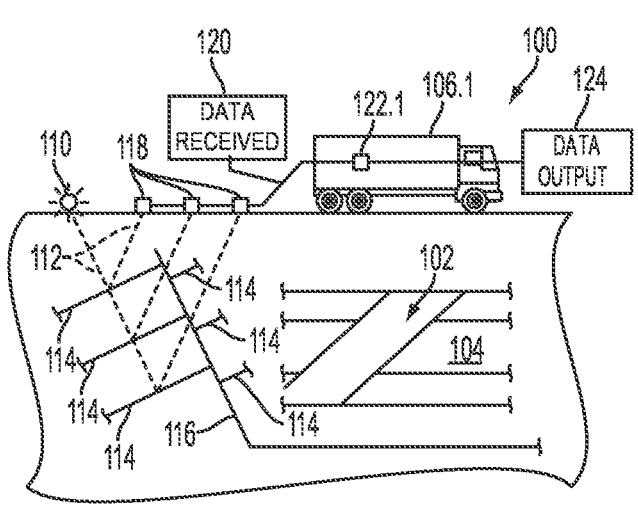
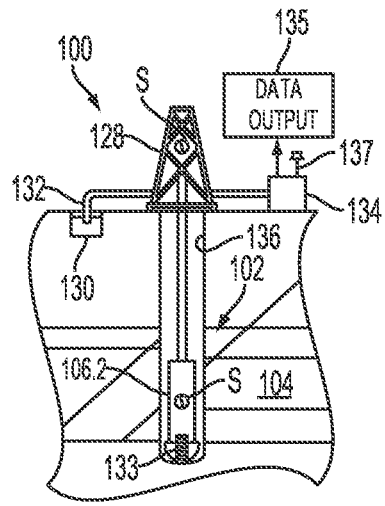
FIG. 1A
FIG. 1B
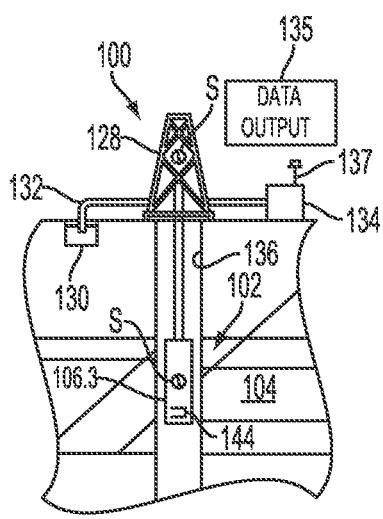
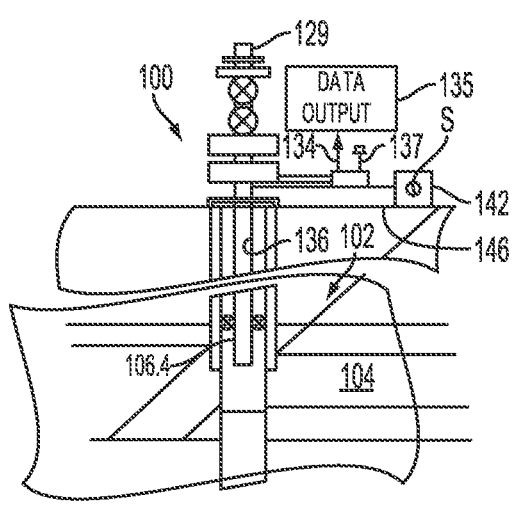
FIG. 1C
FIG. 1D

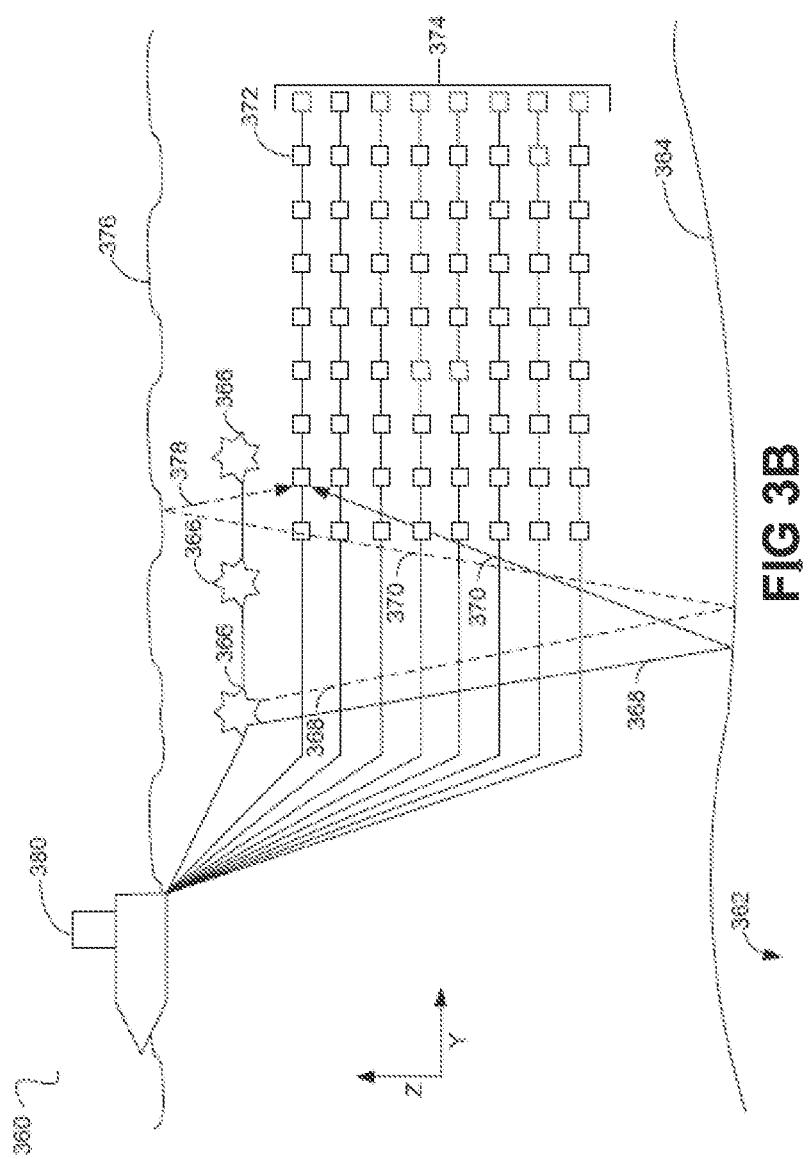

MODELING AND FILTERING COHERENT NOISE IN SEISMIC SURVEYS

CROSS-REFERENCE TO RELATED APPLICATIONS

This application claims priority to U.S. Provisional Patent Application No. 61/947,254, which was filed on Mar. 3, 2014, the entire contents of which are incorporated herein by reference.

BACKGROUND

Operations, such as surveying, drilling, wireline testing, completions, production, planning and analysis can be performed to locate and gather valuable fluids (e.g., hydrocarbons) in underground geological structures (e.g., reservoirs). Acquisition methodologies can use information obtained from surveys to generate maps and other information of the underground geological structures. The maps and other information can be analyzed to determine whether the formations contain fluids and whether such fluids are reasonably recoverable.

In performing surveys, seismic sources and seismic receivers can be placed at various locations of a region on an earth surface (e.g., a land surface, sea surface, or a sea floor) with the seismic sources activated to generate seismic waves. Examples of seismic sources include explosives, air guns, vibrators, and the like that generate seismic waves. Some of the seismic waves generated by a seismic source travel into underground geological structures, with a portion of the seismic waves reflected back to the surface (e.g., land surface, sea surface or sea floor, or wellbore surface) for receipt by seismic receivers (e.g., geophones, hydrophones, etc.). These seismic receivers produce signals that represent detected seismic waves. Signals from the seismic receivers are processed to yield information about the content and features of the underground geological structures.

SUMMARY

The present disclosure is directed to modeling and filtering coherent noise in seismic surveys. Embodiments of the disclosure provide a method including obtaining seismic information of a region resulting from a source waveform applied to the region. The method also includes obtaining an estimate of one or more visco-elastic properties of a near-surface of the region. The method further includes determining an estimate of propagation of guided waves in the region based on the estimate of one or more visco-elastic properties of the near-surface of the region. Additionally, the method includes determining a model of the guided waves in the near-surface of the region using the estimate of propagation of the guided waves and an estimate of the source waveform. Moreover, the method includes determining a filtered output of the seismic information by removing the model of the guided waves from the seismic information.

In some embodiments, obtaining the estimate of the visco-elastic properties includes determining the visco-elastic properties using P-wave and S-wave propagation quantities estimated from a kinematic effect and a dynamic effect of the seismic information.

In some embodiments, the method includes determining one or more locations of one or more features of the region using the filtered output.

In some embodiments, determining the model of the guided waves in the near-surface includes modeling the waves guided within an upper boundary that is a free surface of the region, and a lower boundary that is a bottommost surface of a weathered layer of the region directly adjacent to and below the free surface.

In some embodiments, the guided waves are coherent noise in the near-surface layer induced by a seismic source.

In some embodiments, the one or more visco-elastic properties of a near-surface include a velocity and an attenuation of the guided waves.

In some embodiments, the estimate of the source waveform represents the source waveform after being applied to the region by a seismic source.

In some embodiments, the determining the model of the guided waves includes combining the estimate of propagation of guided waves with the estimate of the source waveform.

Embodiments of the disclosure also provide a computing system including one or more processors; and a memory system having one or more non-transitory computer-readable media storing instructions. When executed by at least one of the one or more processors, the instructions cause the computing system to perform operation including obtaining seismic information of a region resulting from a source waveform applied to the region. The operations also include obtaining an estimate of visco-elastic properties of a near-surface of the region. The operations further include determining an estimate of propagation of guided waves in the region based on the estimate of visco-elastic properties of the near-surface of the region. Additionally, the operations include determining a model of the guided waves in the near-surface of the region using the estimate of propagation of the guided waves and an estimate of the source waveform. Moreover, the operations include determining a filtered output of the seismic information by removing the model of the guided waves from the seismic information.

In some embodiments, obtaining the estimate of the visco-elastic properties includes determining the visco-elastic properties using P-wave and S-wave propagation quantities estimated from a kinematic effect and a dynamic effect of the seismic information.

In some embodiments, the operations include determining one or more locations of one or more features of the region using the filtered output.

In some embodiments, determining the model of the guided waves in the near-surface includes modeling the guided waves within an upper boundary that is a free surface of the region, and a lower boundary that is a bottommost surface of a weathered layer of the region directly adjacent to and below the free surface.

In some embodiments, the guided waves are coherent noise in the near-surface layer induced by a seismic source.

In some embodiments, the one or more visco-elastic properties of a near-surface include a velocity and an attenuation of the guided waves.

In some embodiments, the estimate of the source waveform represents the source waveform after being applied to the region by a seismic source.

In some embodiments, the determining the model of the guided waves includes combining the estimate of propagation of guided waves with the estimate of the source waveform.

Embodiments of the disclosure also provide a computer program product comprising non-transitory computer-readable device storing program instructions that, when executed by at least one processor of a computing system, cause the computing system to perform operations. The operations include obtaining an estimate of visco-elastic properties of a near-surface of the region. The operations further include determining an estimate of propagation of guided waves in the region based on the estimate of visco-elastic properties of the near-surface of the region. Additionally, the operations include determining a model of the guided waves in the near-surface of the region using the estimate of propagation of the guided waves and an estimate of the source waveform. Moreover, the operations include determining a filtered output of the seismic information by removing the model of the guided waves from the seismic information.

In some embodiments, obtaining the estimate of the visco-elastic properties includes determining the visco-elastic properties using P-wave and S-wave propagation quantities estimated from a kinematic effect and a dynamic effect of the seismic information.

In some embodiments, the operations include determining one or more locations of one or more features of the region using the filtered output.

In some embodiments, the determining the model of the guided waves includes combining the estimate of propagation of guided waves with the estimate of the source waveform.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation according to some embodiments.

DESCRIPTION OF EMBODIMENTS

Figure 2:
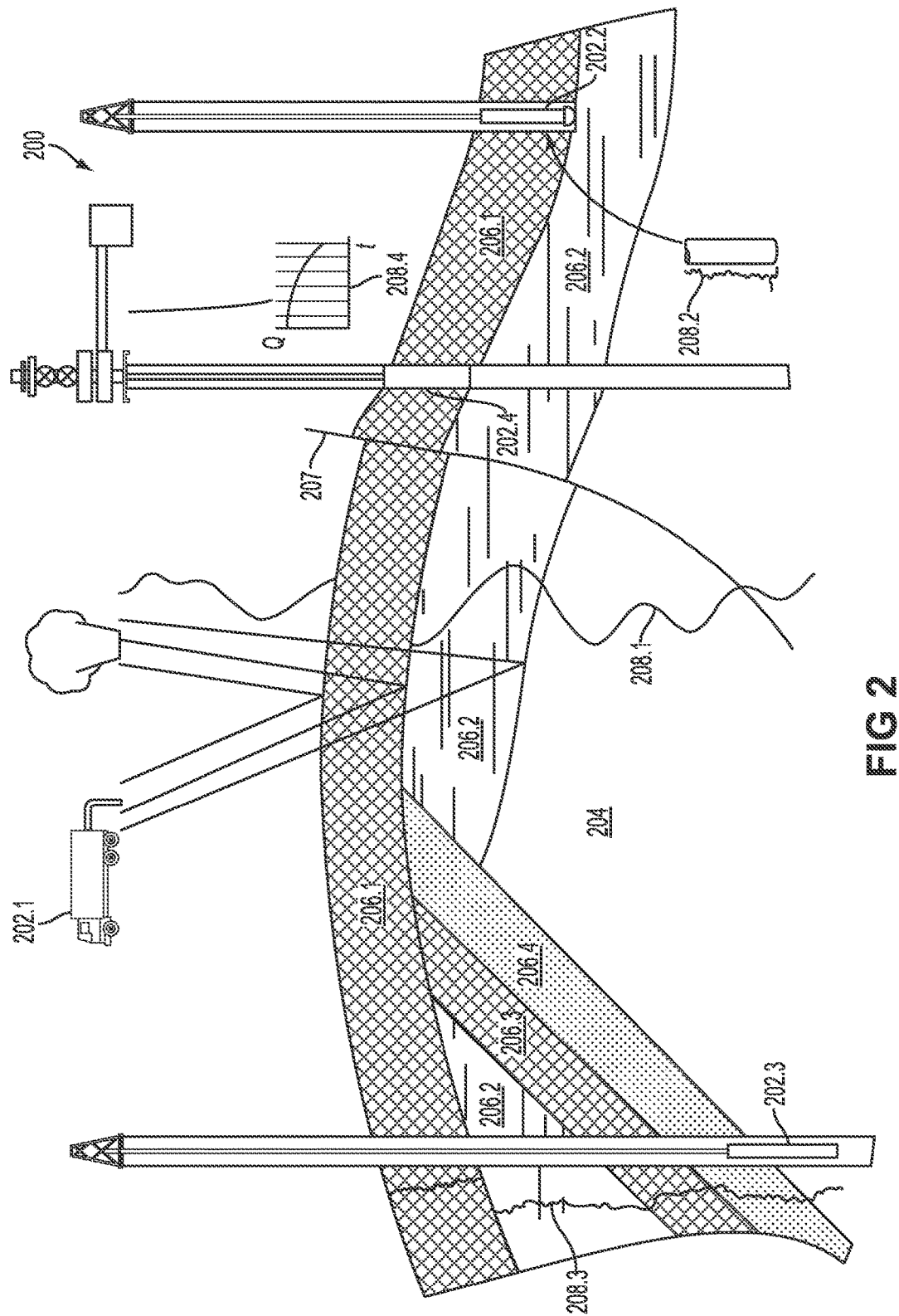

The present disclosure relates to modeling and filtering coherent noise in seismic surveys. In accordance with aspects of the present disclosure, a near-surface of a region (land or water) of the earth's surface is described as a layered waveguide having an upper boundary and a lower boundary. In embodiments, the upper boundary is a free (i.e., external) surface of the region, and a lower boundary is the bottommost surface of a weathered layer of the region that is directly adjacent to and below the free surface. For example, the upper boundary and/or the lower boundary can represent substantially planar surfaces of an uppermost layer of the region. In other embodiments, the waveguide is a water layer, wherein the upper boundary is a free surface of a water layer over the region, and the lower boundary is the bottom surface of weathered layer adjacent to an outermost surface of the region. In seismic surveying, energy trapped in this waveguide comprises a substantial portion of the wave field recorded in a seismic survey. The energy trapped in the waveguide manifests itself as coherent noise, which contaminates seismic signals detected by seismic receivers.

Coherent noise includes guided P-waves and S-waves (e.g., surface waves) induced from seismic sources that includes horizontally-traveling waves confined in a near-surface layer of an earth surface. The guided P-waves and S-waves can be comprised of several modes, including Rayleigh waves (a.k.a, Scholle waves in shallow water environments), Lamb waves (e.g., when strong velocity inversions are present), Love waves (e.g., horizontal components when properly excited), Stoneley waves (e.g., waves that propagate along a solid-fluid interface, or a solid-solid interface). Some of these modes can occur simultaneously and, thus, may be superimposed on each other.

When a seismic survey applies a source wave to land, the coherent noise recorded by seismic sensors can be complex due to interference of reflected multiples of the P-waves and S-waves and of converted waves in the near-surface. Offshore records-OBC (ocean bottom cable) and towed streamer in shallow water can, respectively, display two distinct groups of waves: the first being of low-frequency, low-velocity normal modes (e.g., Scholte waves), and the second being leaking modes (e.g., guided waves) that have higher velocities and frequencies. When the sub-water layers are composed of relatively soft saturated rocks with high Poisson's ratio, the leaking modes can be closely approximated by guided acoustic waves.

In accordance with principles of the present disclosure, the amplitudes of the guided waves are much higher than those of the target reflections from geologic features. In the case of guided P-waves, the phase velocities approach the moveout of reflections (e.g., arrival times of reflections that vary according to a specific function) at far offset, which makes filtering them challenging. Systems and methods disclosed herein provide a process that filters (e.g., attenuates) the guided waves within a wave field data produced by a seismic survey or similar data that was previously obtained (e.g., from a previous survey).

In accordance with principles of the present disclosure, the process characterizes the near-surface of a region in terms of visco-elastic properties, which are properties of materials that exhibit viscous and elastic behavior under deformation. The characterization of the near-surface can be performed by modeling the visco-elastic properties using one or more modeling and simulation applications, such as the Surface Wave Analysis, Modeling, and Inversion (SWAMI) (Schlumberger Limited, Houston Tex.), Simultaneous Joint Inversion (SJI) (Schlumberger Limited, Houston Tex.), diving wave tomography (DWT), quality factor tomography ("QTOMO") (Schlumberger Limited, Houston Tex.), etc. The process disclosed herein also determines a spatial distribution of the propagation properties of the guided waves. In some embodiments, for example, the process determines velocity and attenuation of the guided waves from the visco-elastic properties of the near-surface model. The process further uses the properties of the guided waves to model coherent noise and then subtract them from the seismic data.

Guided waves propagate horizontally from their source and can be characterized by a dispersive behavior. The Green's function describing the propagation of a guided wave v for a given frequency co can be written as the sum of laterally propagating modes:

$$v(x,\omega,s)=\Sigma_m \phi_m(z,\omega,x_h)A_m(x_h,\omega,s_h)\exp(-i\omega\tau_m(x_h,\omega,s_h)) \phi_m(s_z,\omega,s_h) \quad (1)$$

where x and s are spatial coordinates; $x_h$ and $s_h$ are horizontal coordinates of seismic receivers and seismic sources, respectively, and z and $S_z$ are depths of the seismic receivers and the seismic sources, respectively. Kinematic aspects of guided-wave propagation follow from the travel times $\tau_m$, which can be computed from the velocity of propagation of guided waves (phase velocity field). Geometrical spreading, intrinsic attenuation, and leakage are represented by amplitudes $A_m$. The local structure of the medium beneath the seismic source and the seismic receivers follows from the modal amplitudes $\phi_m$. The forgoing parameters govern guided wave propagation along the near-surface can be estimated in two different ways: (i) analysis of the coherent noise properties; and (ii) modeling from the near-surface visco-elastic properties.

Embodiments consistent with the present disclosure model coherent noise using the near-surface visco-elastic properties, which can be derived from modeling and simulation processes, such as those previously discussed (e.g., SWAMI, SJI, DWT, QTOMO, and the like). Thus, using equation (1), the observed wave field at a certain location of a region be expressed in terms of its kinematic behavior (arrival time), and its dynamic behavior (amplitude).

The kinematic behavior of guided-wave propagation depends on the visco-elastic properties of the near-surface through the phase velocity field. The amplitude behavior consists of a combination of various components: (i) geometrical spreading, the intrinsic attenuation and the leakage incorporated in the ray amplitudes $A_m$; (ii) modal amplitudes $\phi_m$; and (iii) source waveform. Coherent noise properties and near-surface visco-elastic properties (i.e., points (i) and (ii) above) can be estimated from the near-surface model while the source waveform (i.e., point (iii) above) is obtained from the data or modeled from modeling and simulation processes, such as finite element method, finite difference method, and the like).

Reference will now be made in detail to embodiments, examples of which are illustrated in the accompanying drawings and figures. In the following detailed description, numerous specific details are set forth in order to provide a thorough understanding of the embodiments. However, it will be apparent to one of ordinary skill in the art that embodiments of the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that may provide a resistivity or other measurement of the formation at various depths.

A production decline curve or graph 208.4 is a dynamic data plot of the fluid flow rate over time. The production decline curve may provide the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, e.g., below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3A:
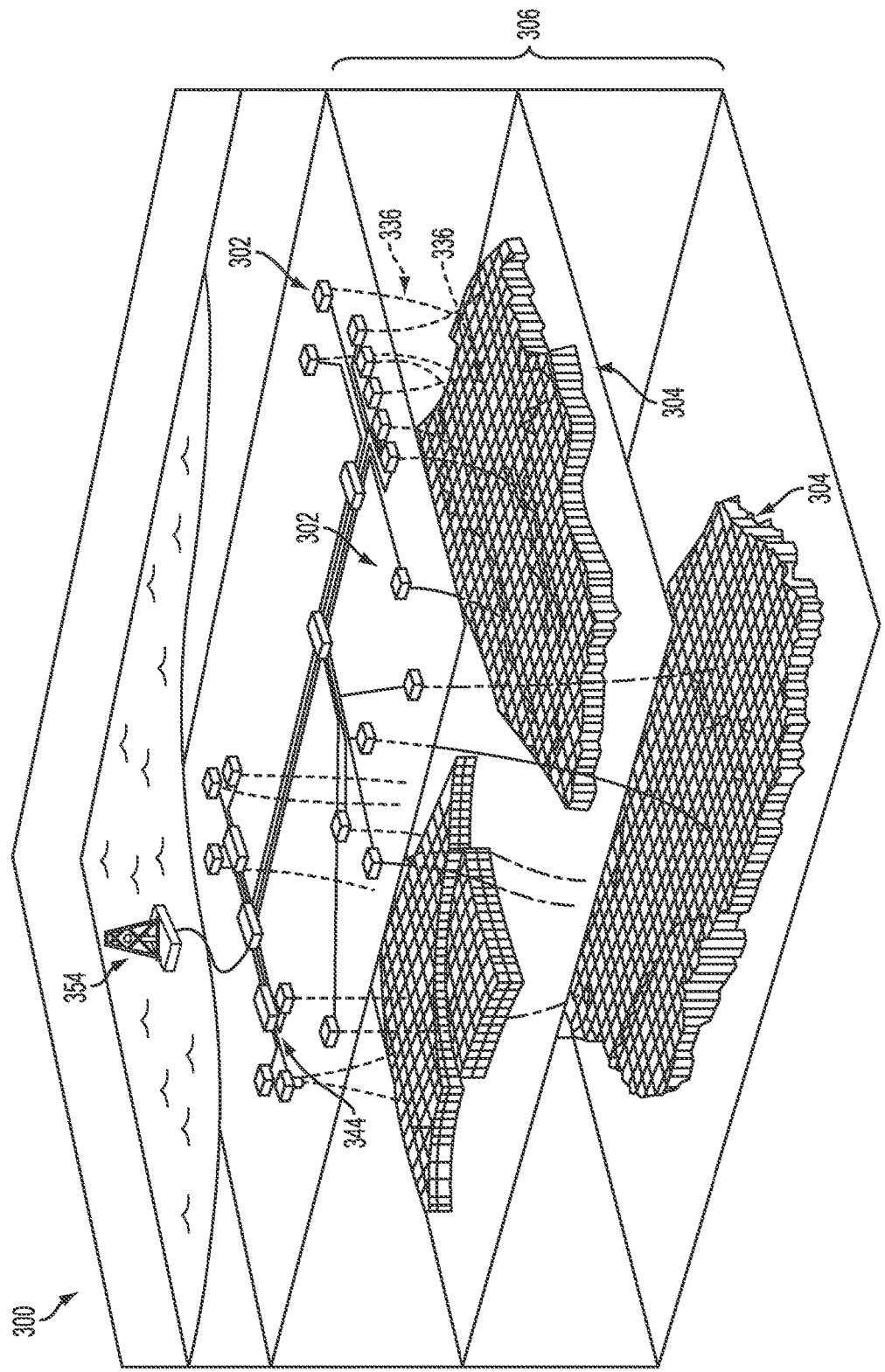

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. At least part of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems may tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
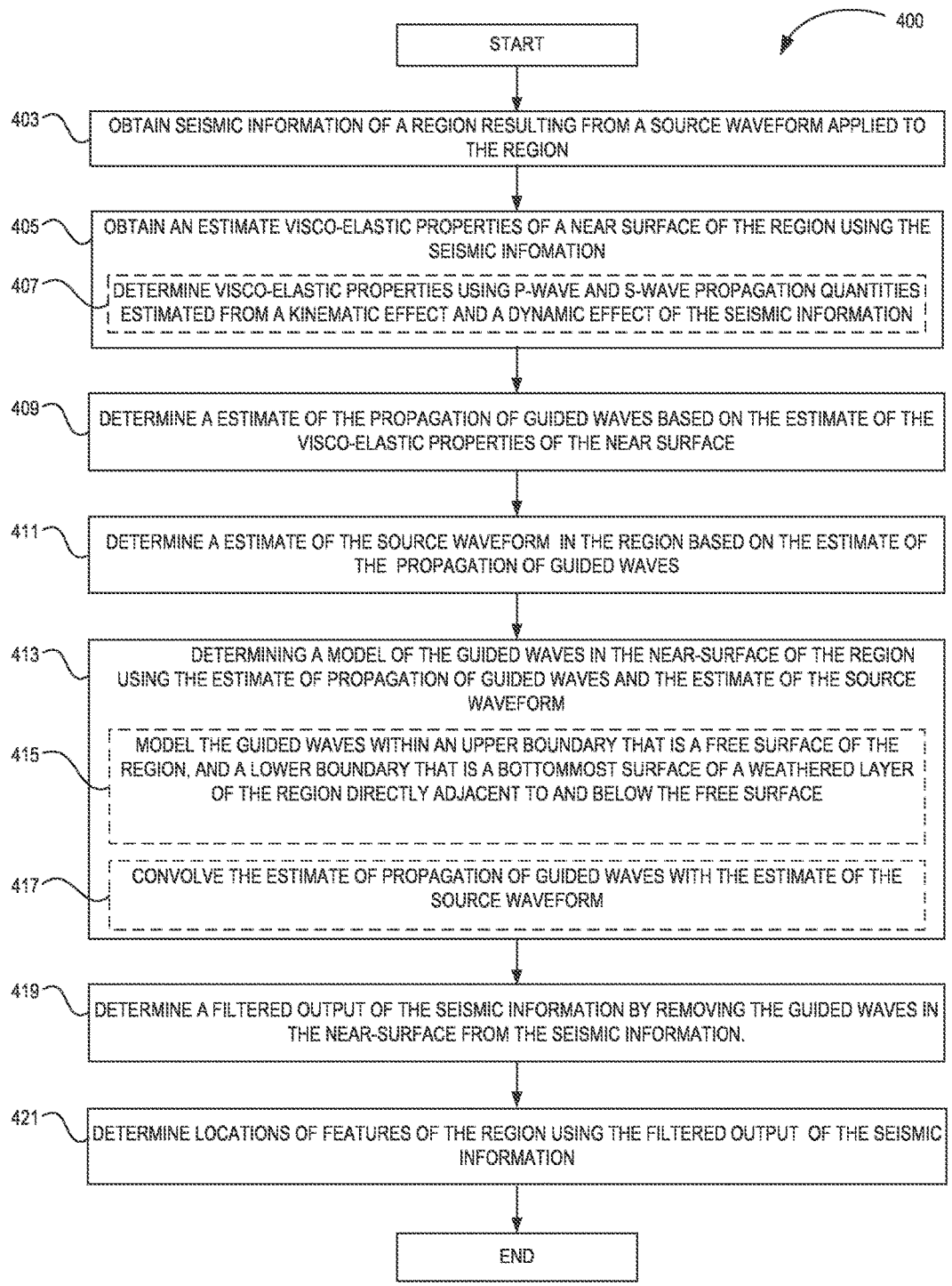
FIG. 4 illustrates a flowchart of a method for processing seismic data according to some embodiments.

FIG. 4 illustrates a flow diagram of an example of a method 400 for modeling and filtering noise in seismic surveys in accordance with the principles of the present disclosure. The method 400 can be implemented using the environment of FIGS. 1-4B and/or the computing system of FIG. 5. At 403, the method 400 obtains seismic information of a region (e.g., earth formation 116) resulting from a source waveform applied to the region. In embodiments, the method 400 uses a seismic source (e.g., source 110) that outputs the source waveform (e.g., sound vibration 112) into the region. Further, the method 400 uses one or more seismic receivers (e.g., geophone-receivers 118) to sense and record seismic information (e.g., seismic data output 124) representing echoes of the source waveform from features (e.g., formations containing fluids) reflected from within the region. However, as discussed previously, the seismic receivers also sense noise resulting from portions of the source waveform that become trapped in the near-surface of the region. This noise can obscure subterranean features in that may be detected.

At 405, the method 400 can obtain an estimate of visco-elastic properties of a near surface of the region using the seismic information obtained at 403. In accordance with aspects of the present disclosure, the visco-elastic properties characterize the near-surface of the region. In embodiments, at 407, the visco-elastic properties are determined using P-wave and S-wave propagation quantities estimated from kinematic effects and dynamic effects of the seismic information using one or more modeling and simulation processes, such as SWAMI, SJI, DWT, QTOMO, or the like. As discussed previously herein, the kinematic behavior of guided-wave propagation is linked to the frequency dependent arrival times ($\tau_m$), which in turn depend on the background medium through the phase velocity field. Accordingly, in embodiments consistent with the present disclosure, the kinematic behavior of the guided-waves can be determined by discretizing the surface of the region into cells and characterizing each of the cells by the local measured phase velocity. The propagation of the guided waves in three-dimensions can then be simulated (e.g., using horizontal ray tracing).

At 409, the method 400 determines an estimate of the propagation of guided waves (e.g., noise) based on the visco-elastic properties of the near surface obtained at 405. In accordance with principles of the present disclosure, the method 400 determines an estimate of Green's Function (equation (1) above) for the guided waves based on the visco-elastic properties of the near-surface obtained at 405, which represent coherent noise in the near-surface. In accordance with aspects of the present disclosure, the method provides models of coherent noise after the Green Function is convolved with the source wave.

At 411, the method 400 determines an estimate of the source waveform based on the estimate of the propagation of guided waves determined at 409. In accordance with principles of the present disclosure, the model of the source waveform represents the effective source wave applied to the region as modified by the region (rather than the pure source waveform output directly from the seismic source). The estimate of the effective source waveform can be determined by de-convolving the seismic data obtained at 403 using the Green's Function and filtering the result.

At 413, the method 400 determines a model of guided waves (e.g., noise) in the near-surface using the estimate of the source waveform determined at 411. In embodiments, at 415, the model represents the guided waves within an upper boundary that is a free surface of the geologic formation, and a lower boundary that is a bottommost surface of a weathered layer of the geologic formation directly adjacent to and below the free surface. Additionally, in embodiments, at 417, the model can be determined by convolving the Green's Function for the guided waves determined at 413 with the estimate of the source waveform in the region determined at 417.

At 417, the method 400 determines a filtered output of the seismic information detected at 405 by subtracting the guided waves in the near-surface determined at 413 from the seismic information obtained at 403. At 421, the method 400 determines locations of features of the region using the filtered output of the seismic information obtained at 417. For example, the method 400 may transform the filtered output into images of the features on a display device (e.g., I/O device 244).

Geologic interpretations, models, and/or other interpretation aids discussed previously herein may be refined in an iterative fashion. This may include use of feedback loops executed on an algorithmic basis, such as at a computing device, and/or through manual control by a user who may make determinations regarding whether a given step, action, template, model, or set of curves has become sufficiently accurate for the evaluation of the subsurface three-dimensional region under consideration.

The flow diagram in FIG. 4 illustrates functionality and operation of possible implementations of systems, devices, methods, and computer program products according to various embodiments of the present disclosure. Each block in the flow diagrams of FIG. 4 can represent a module, segment, or portion of program instructions, which includes one or more computer executable instructions for implementing the illustrated functions and operations. In some alternative implementations, the functions and/or operations illustrated in a particular block of the flow diagrams can occur out of the order shown in FIG. 4. For example, two blocks shown in succession can be executed substantially concurrently, or the blocks can sometimes be executed in the reverse order, depending upon the functionality involved. It will also be noted that each block of the flow diagrams and combinations of blocks in the block can be implemented by special purpose hardware-based systems that perform the specified functions or acts, or combinations of special purpose hardware and computer instructions.

Figure 5:
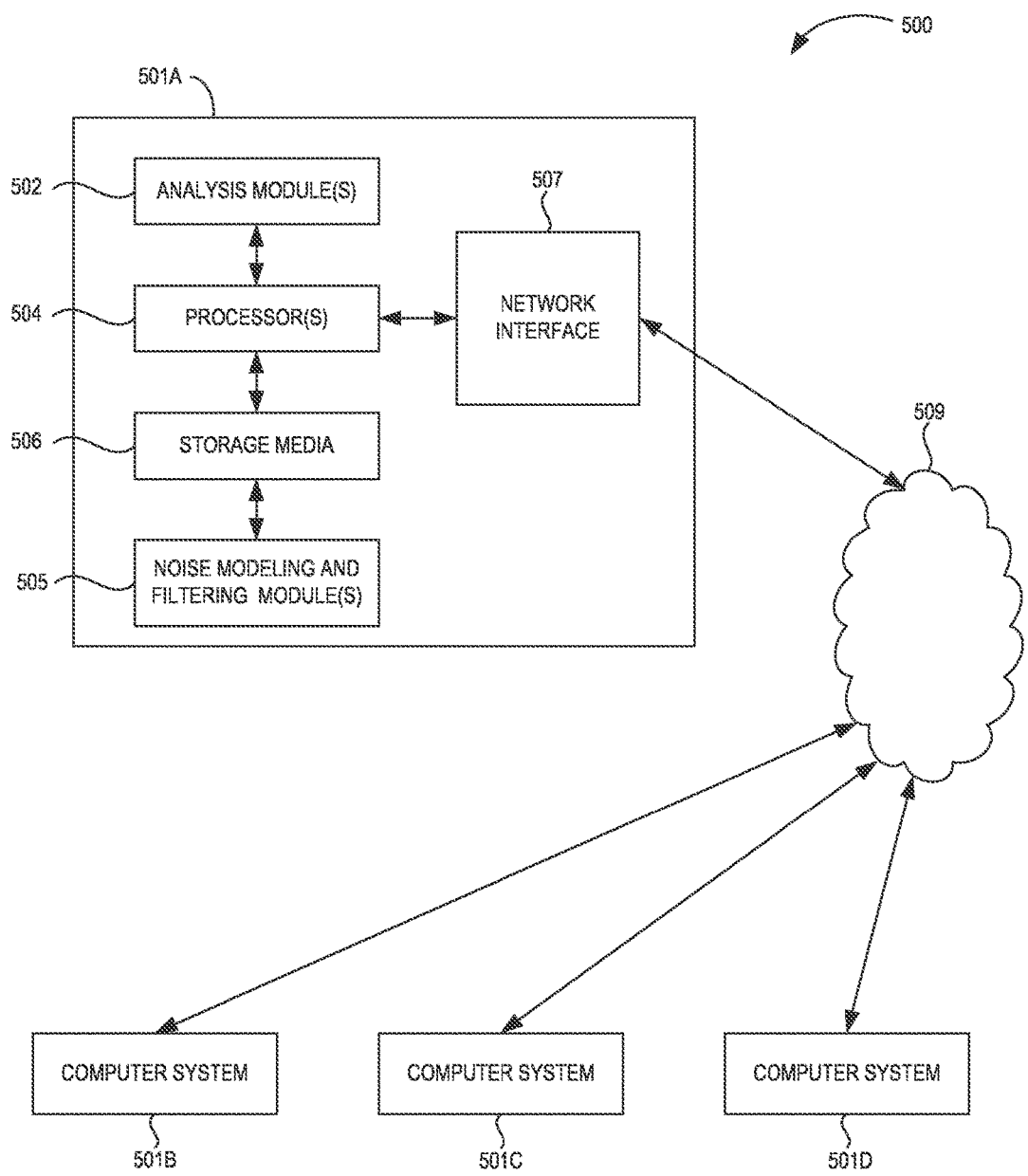
FIG. 5 illustrates a schematic view of a computing system according to some embodiments.

In some embodiments, the method 400 may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis module(s) 502 configured to perform various tasks according to some embodiments, such as one or more methods disclosed herein (e.g., method 400 and variations thereof). To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor can include a microprocessor, microcontroller, processor module or subsystem, programmable integrated circuit, programmable gate array, or another control or computing device.

The storage media 506 can be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 500 contains one or more image partition noise modeling and filtering module(s) 505. In the example of computing system 500, computer system 501A includes the image partition aligning and stacking module 505. In some embodiments, a single image partition and aligning module may be used to perform at least some aspects of one or more embodiments of the method 400. In alternate embodiments, a plurality of image partition aligning and stacking modules may be used to perform at least some aspects of method 400.

It should be appreciated that computing system 500 is only one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Geologic interpretations, models and/or other interpretation aids may be refined in an iterative fashion; this concept is applicable to method 400 as discussed herein. This can include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional region under consideration.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. Moreover, the order in which the elements of the methods 400 are illustrated and described may be re-arranged, and/or two or more elements may occur simultaneously. The embodiments were chosen and described in order to facilitate an explanation the principals of herein and their practical applications, to thereby enable others skilled in the art to utilize the systems, methods, and/or computer-readable media with various modifications as are suited to the particular use contemplated.

What is claimed is:

1. A method comprising:
   obtaining seismic information of a region resulting from a source waveform applied to the region;
   obtaining an estimate of one or more visco-elastic properties of a near-surface layer of the region;
   determining, using a computing device, an estimate of propagation of guided waves in the region based on the estimate of one or more visco-elastic properties of the near-surface layer of the region, wherein determining the estimate of propagation of guided waves comprises using a sum of laterally propagating modes, and wherein using the sum of laterally propagating modes comprises determining a first modal amplitude based on a depth of a seismic receiver, frequency, and a horizontal position of the seismic receiver;
   determining an estimate of the source waveform based on the estimate of propagation of the guided waves, wherein the estimate of the source waveform represents the source waveform after being applied to the region by a seismic source, as modified by the region;

determining, using the computing device, a model of the guided waves in the near-surface layer of the region using the estimate of the source waveform; and determining, using the computing device, a filtered output of the seismic information by removing the model of the guided waves from the seismic information.

2. The method of claim 1, wherein obtaining the estimate of the visco-elastic properties comprises determining the visco-elastic properties using P-wave and S-wave propagation quantities estimated from a kinematic effect and a dynamic effect of the seismic information.

3. The method of claim 2, further comprising:
determining the kinematic effect of the seismic information by discretizing a surface of the region into cells;
characterizing each of the cells by a local measured phase velocity; and
simulating the propagation of the guided waves in three dimensions using horizontal ray tracing based at least partially upon the characterization of each of the cells.

4. The method of claim 1 further comprising determining one or more locations of one or more features of the region using the filtered output.

5. The method of claim 1, wherein determining the model of the guided waves in the near-surface layer comprises modeling the guided waves within an upper boundary that is a free surface of the region, and a lower boundary that is a bottommost surface of a weathered layer of the region directly adjacent to and below the free surface.

6. The method of claim 1, wherein the guided waves are coherent noise in the near-surface layer induced by a seismic source.

7. The method of claim 1, wherein the one or more visco-elastic properties of the near-surface layer comprise a velocity and an attenuation of the guided waves.

8. The method of claim 1, wherein the determining the model of the guided waves comprises convolving the estimate of propagation of guided waves with the estimate of the source waveform.

9. The method of claim 1, wherein the estimate of the source waveform is determined by de-convolving the seismic data using Green's Function.

10. The method of claim 1, wherein the determining the model of the guided waves comprises convolving Green's Function for the guided waves with the estimate of the source waveform in the region.

11. The method of claim 1, further comprising:
determining a location of a feature in the region using the filtered output; and
transforming the filtered output into an image comprising the feature on a display device.

12. The method of claim 1, wherein the estimate of propagation of the guided waves is determined using Green's function, which comprises the sum of laterally propagating modes.

13. The method of claim 1, further comprising determining the sum of the laterally propagating modes, comprising:
determining a travel time based on the horizontal position of the seismic receiver, frequency, and a horizontal position of the seismic source;
estimating geometrical spreading, intrinsic attenuation, and leakage by determining an attenuation amplitude based on the horizontal position of the seismic receiver, frequency, and the horizontal position of the seismic source; and
determining a second modal amplitude based on a depth of the seismic source, frequency, and the horizontal position of the seismic source; and combining the first modal amplitude, the travel time, the attenuation amplitude, and the second modal amplitude; and
summing the combined first modal amplitude, travel time, attenuation amplitude, and second modal amplitude for each mode.

14. The method of claim 13, wherein the travel time is at least part of an exponential term.

15. The method of claim 1, wherein using the sum of laterally propagating modes also comprises determining an attenuation amplitude based on the horizontal position of the seismic receiver, frequency, and a horizontal position of the seismic source.

16. The method of claim 1, wherein using the sum of laterally propagating modes also comprises determining a travel time based on the horizontal position of the seismic receiver, frequency, and a horizontal position of the seismic source.

17. The method of claim 1, wherein using the sum of laterally propagating modes also comprises determining a second modal amplitude based on a depth of the seismic source, frequency, and a horizontal position of the seismic source.

18. A computing system, comprising:
one or more processors; and
a memory system comprising one or more non-transitory computer-readable media storing instructions that, when executed by at least one of the one or more processors, cause the computing system to perform operations, the operations comprising:
obtaining seismic information of a region resulting from a source waveform applied to the region;
obtaining an estimate of visco-elastic properties of a near-surface of the region;
determining an estimate of propagation of guided waves in the region based on the estimate of visco-elastic properties of the near-surface layer of the region, wherein determining the estimate of propagation of guided waves comprises using a sum of laterally propagating modes, and wherein using the sum of laterally propagating modes comprises determining a first modal amplitude based on a depth of a seismic receiver, frequency, and a horizontal position of the seismic receiver;
determining an estimate of the source waveform based on the estimate of propagation of the guided waves, wherein the estimate of the source waveform represents the source waveform after being applied to the region by a seismic source, as modified by the region;
determining a model of the guided waves in the near-surface layer of the region using the estimate of the source waveform; and
determining a filtered output of the seismic information by removing the model of the guided waves from the seismic information.

19. A computer program product comprising non-transitory computer-readable device storing program instructions that, when executed by at least one processor of a computing system, cause the computing system to perform operations, the operations comprising:
obtaining seismic information of a region resulting from a source waveform applied to the region;
obtaining an estimate of visco-elastic properties of a near-surface of the region;
determining, using the computing system, an estimate of propagation of guided waves in the region based on the estimate of visco-elastic properties of the near-surface layer of the region, wherein determining the estimate of propagation of guided waves comprises using a sum of laterally propagating modes, and wherein using the sum of laterally propagating modes comprises determining a first modal amplitude based on a depth of a seismic receiver, frequency, and a horizontal position of the seismic receiver;

determining an estimate of the source waveform based on the estimate of propagation of the guided waves, wherein the estimate of the source waveform represents the source waveform after being applied to the region by a seismic source, as modified by the region;

determining, using the computing system, a model of the guided waves in the near-surface layer of the region using the estimate of the source waveform; and determining, using the computing system, a filtered output of the seismic information by removing the model of the guided waves from the seismic information.

20. The computer program product of claim 19, further comprising determining locations of features of the region using the filtered output.

\* \* \* \* \*